United States Patent
Marra et al.

(10) Patent No.: US 8,483,894 B2
(45) Date of Patent: Jul. 9, 2013

(54) ECP TERMINAL MODE OPERATION

(75) Inventors: Jon M. Marra, Henderson, NY (US); John W. Laduc, Sackets Harbor, NY (US); Dale R. Stevens, Adams Center, NY (US)

(73) Assignee: New York Air Brake Corporation, Watertown, NY (US)

( * ) Notice: Subject to any disclaimer, the term of this patent is extended or adjusted under 35 U.S.C. 154(b) by 325 days.

(21) Appl. No.: 12/941,588

(22) Filed: Nov. 8, 2010

(65) Prior Publication Data

US 2011/0112706 A1 May 12, 2011

Related U.S. Application Data

(60) Provisional application No. 61/260,181, filed on Nov. 11, 2009.

(51) Int. Cl.
*B60T 13/00* (2006.01)
*B60T 13/66* (2006.01)
*G06F 17/00* (2006.01)
*G05D 13/34* (2006.01)

(52) U.S. Cl.
USPC ............ 701/19; 701/20; 701/70; 303/22.6

(58) Field of Classification Search
USPC ............ 701/1, 19, 20, 70, 93; 246/167 R, 246/182 R, 182 B; 105/26.05, 61; 303/1, 303/5, 7, 9, 20, 22.2, 22.6, 3
See application file for complete search history.

(56) References Cited

U.S. PATENT DOCUMENTS

| | | | |
|---|---|---|---|
| 6,217,126 B1 * | 4/2001 | Kull | 303/3 |
| 6,229,452 B1 * | 5/2001 | Kull | 340/3.51 |
| 6,375,277 B1 * | 4/2002 | Carroll | 303/68 |
| 6,484,085 B2 | 11/2002 | Marra et al. | |
| 6,648,425 B2 | 11/2003 | Marra et al. | |
| 6,676,229 B1 | 1/2004 | Marra et al. | |
| 6,759,921 B1 | 7/2004 | Govind et al. | |
| 6,839,664 B1 * | 1/2005 | Kull | 703/23 |
| 6,932,437 B1 | 8/2005 | Root et al. | |
| 6,972,670 B2 | 12/2005 | LaDuc et al. | |
| 6,980,127 B2 | 12/2005 | Lumbis et al. | |
| 7,004,550 B2 | 2/2006 | Root et al. | |
| 7,073,753 B2 | 7/2006 | Root et al. | |
| 7,673,568 B2 | 3/2010 | Marra et al. | |
| 2002/0017439 A1 * | 2/2002 | Hill et al. | 188/107 |
| 2002/0180264 A1 * | 12/2002 | Moffitt | 303/128 |
| 2006/0290199 A1 * | 12/2006 | Beck et al. | 303/7 |

* cited by examiner

*Primary Examiner* — Thomas Tarcza
*Assistant Examiner* — Edward Pipala
(74) *Attorney, Agent, or Firm* — Barnes & Thornburg LLP

(57) ABSTRACT

The present method operates an electrically controlled pneumatic (ECP) brake system that includes a system controller and a plurality of ECP devices on a train, in a semi-active mode between an active mode and an in active mode. The method includes setting the system controller to the semi-active mode if the ECP brake command is release; and setting the released ECP devices to the inactive state by the system controller when entering the semi-active mode. The ECP devices are set to an active state and to apply the brake by the system controller in response to an ECP brake command of apply. The ECP devices are reset to release and then to the inactive state by the system controller in response to an ECP brake command of release.

12 Claims, 3 Drawing Sheets

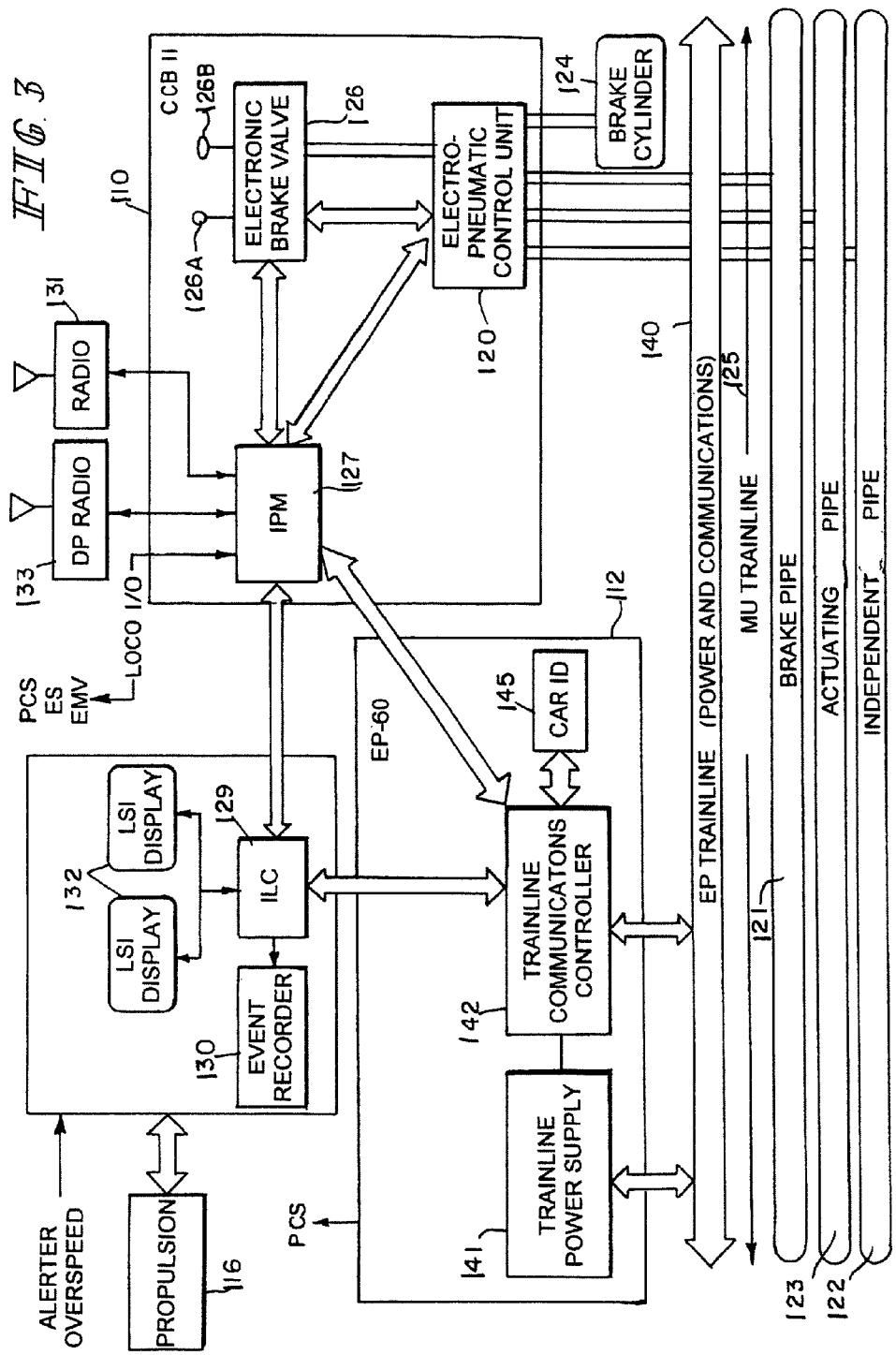

ECP TERMINAL MODE OPERATION

This application is a U.S. Patent Application that relies for priority under 35 U.S.C. 120 on Provisional Application Ser. No. 61/260,181 filed on Nov. 11, 2009, which is incorporated herein by reference.

BACKGROUND AND SUMMARY

The present disclosure is directed to electrically controlled pneumatic (ECP) brake systems and more specifically to a semi-active mode of the system between the active mode and the inactive mode.

The present method manages ECP equipped trains in situational environments where unrequested train stoppage due to detection of on-board equipment failure negatively impacts overall railroad operations. Understanding that trains are a component of a larger overall system operation which covers territory from departure to final destination there is a need to isolate the standard mainline operational requirements and enable specialized local operational requirements specific to the local railroad yard and or facilities.

The present method allows an ECP train to transition to and from main line operation from and to yard operation where only a subset of the overall functional control is required. In such situations, the system control capability will provide an increase in performance reliability based on the operating conditions of a given zone and or operation constraint.

With the advent of ECP train brake control for main line operation, many rail yard and siding operational conditions warrant specialized train handling techniques. For example, coal and or ore trains pass through automated loading and unloading facilities. In these situations, the train control is managed either manually or through automated means which may be located on-board or off-board the train. During the automated loading and or unloading process, the train is moved through the loading or unloading facility by constant tractive effort with the train brake released. In the occurrence of an undesired train brake application, the loading and or unloading process would be interrupted. This interruption would be costly in regard to the lost time to stop and restart the loading or unloading process.

The ECP train-lined network operating within this environment brings a new dilemma to this process and the train system. ECP systems have the intelligence to automatically initiate a train stoppage upon the detection of critical ECP system events. These events, although mandatory for mainline operation, may not be relevant for loading, unloading or yard operation, and as a result, create a hindrance to railroad operation where train stoppages are not desirable.

Although the loading and unloading operation has been used as an example of the benefit of this patent, other non-mainline operating scenarios can also benefit from this method.

Current methods for moving ECP trains through loading and unloading facilities include:
  Manually releasing the train brake and mechanically indexing the railroad cars through the loading/unloading facility;
  Set train to conventional operation and control train by locomotive brake only;
  Control the train through the loading/unloading facility with standard ECP brake control and allowing the ECP system to automatically stop the train upon detection of critical system events.

The current American Association of Railroads (AAR) ECP specifications and as a result, current technologies require the ECP system to be either completely active or completely inactive. As a result, if it is desirable to disable ECP for a brief train movement, the ECP system must be re-initialized as the make-up and geometry of the train information is lost in the inactive state. This present method of ECP train brake control allows the ECP system to be placed in a semi-active state where full operational control of the ECP devices on the cars is disabled, and then when desired, the system can be transitioned back to the original state without having to be re-initialized.

The present method operates an ECP brake system, which include a system controller and ECP devices on a train, in a semi-active mode between an active mode and an in active mode. The method includes setting the system controller to the semi-active mode if the ECP brake command is release; and setting the released ECP devices to the inactive state by the system controller when entering the semi-active mode. The ECP devices are set to an active state and to apply the brake by the system controller in response to an ECP brake command of apply. The ECP devices are reset to release and then to the inactive state by the system controller in response to an ECP brake command of release.

The system controller determines if a critical event has occurred for the electrically controlled pneumatic brake system, and if so, the system controller also sets a pneumatic brake system to apply in response to an ECP brake command of apply. The system controller sets the pneumatic brake system to an emergency apply state in response to an ECP brake command of apply if a critical event has occurred. The system controller maintains the electrically controlled pneumatic brake system and the pneumatic brake system applied in response to an ECP release command if the critical event is still present.

In the semi-active state, the system controller maintains power on a train-line to the ECP devices and monitors train-line integrity.

BRIEF DESCRIPTION OF THE DRAWINGS

FIG. 3 is a block diagram of one example of components utilized to integrate a computer controlled brake system and an electro-pneumatic brake system, such components being potential implementation locations for embodiments of the invention.

DETAILED DESCRIPTION OF THE EMBODIMENTS

Figure 1:
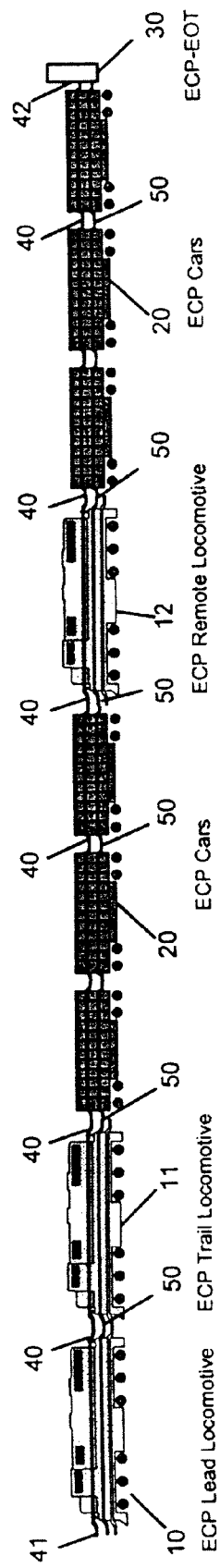
FIG. 1 is an illustration of an ECP train.

Referring to FIG. 1, an ECP train includes a lead locomotive 10 connected to a trail locomotive 11, to a remote locomotive 12 and rail cars 20 by an electrical train-line 40 and a pneumatic brake line 50. A head end train-line termination HETT 41 is provided on the head end unit HEU on the lead locomotive 10 and an end of train-line termination EOTT or ECP-EOT beacon 42 is provided at ECP end of train device (EOT) 30 on the last car.

Figure 2:
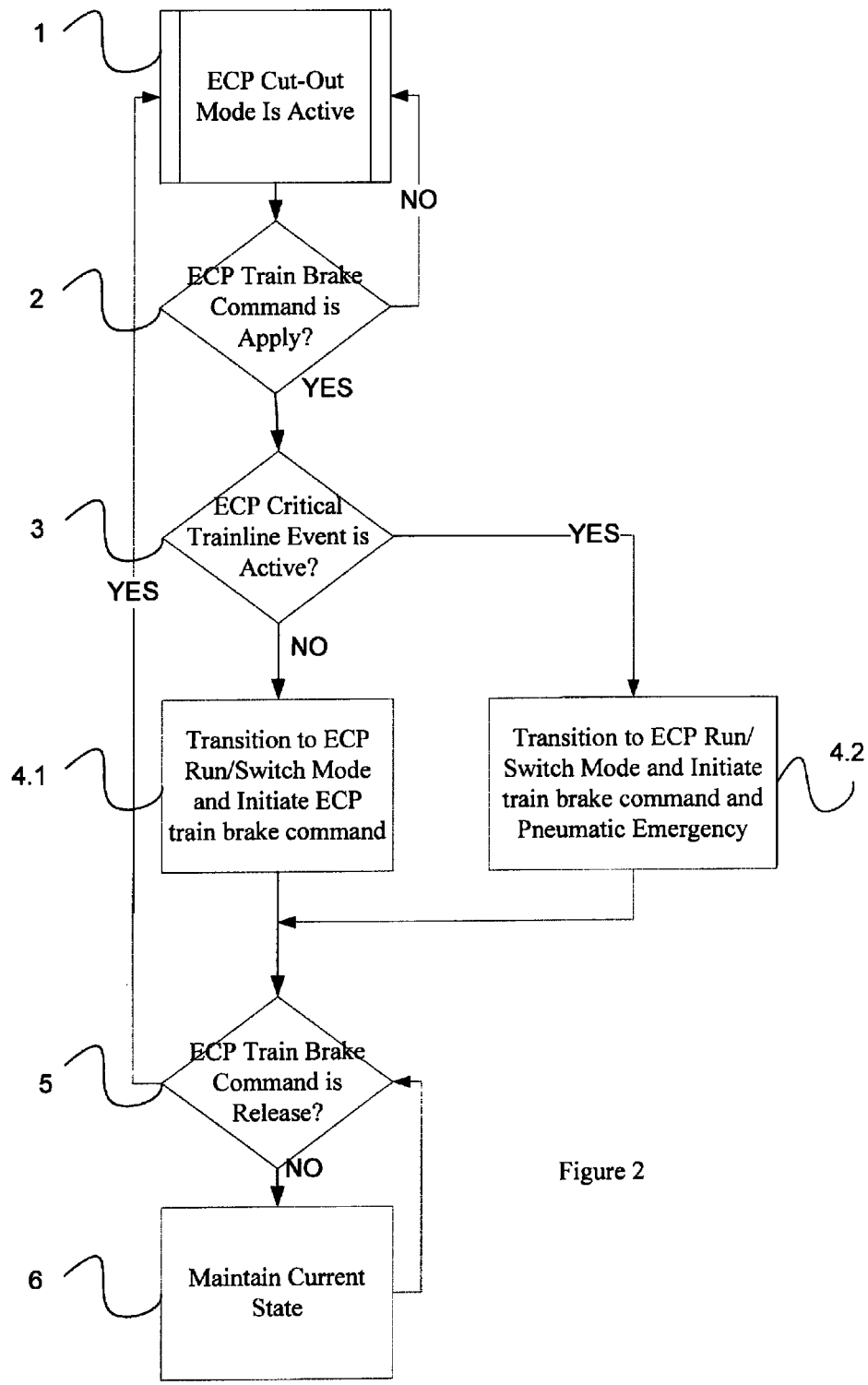
FIG. 2 is a flow chart of a method of operating an ECP brake system in a semi-active mode according to the present disclosure.

Referring to FIG. 2, upon receipt of a train brake release command from the operator or equivalent at 5, the ECP system controller or head end unit HEU shall command the ECP brake control devices located within the train to cut-out mode or inactive state at 1. In the cut-out mode, the train brakes are released and ECP mode inactive state, which renders the electronic train brake control temporarily disabled. During this operating condition, the HEU will maintain train-line power to maintain battery charging to the ECP car control devices CCDs, located on the ECP cars 20, and the ECP EOT 30 and to allow for continued monitoring of train-line 40 integrity from the HEU on the lead locomotive 10 to the ECP EOT 30 which is the last ECP device in the train.

When the HEU is requested to apply the train brake at 2, the HEU will command the train-lined brake control devices from an inactive state to an active state and execute the train brake command for the train stoppage at 4.1. When the HEU is requested to fully release the train brake at 5, the HEU will return the train-lined brake control devices to cut-out mode at 1 (train brake release and ECP mode inactive state) rendering the electronic train brake control disabled once again. In the event that a critical system event is detected as active at 3 when a train brake call is requested, the HEU will also command a rapid reduction of brake pipe 50 pressure to command the back-up pneumatic emergency brake application at 4.2. The pneumatic emergency is applied if a critical event is active due to the possibility that the detected event will compromise the ability of the ECP system to perform train stoppage within acceptable limits.

Critical system events can be, but not limited to, loss of continuity of the intra train communication (ITC) Network from front to rear of the train, or loss of train-line power throughout the train, as well as other ECP related fault conditions.

The loss of ECP train-line 40 continuity within the train could prevent receipt of the train brake command to each CCD and as a result affect train stoppage performance. To monitor train-line continuity, the HEU looks for the loss of the ECP EOT Beacon 42 or loss of the HETT 41 as monitored on the ECP ITC Network 40. When the HEU detects either a loss of ECP EOT Beacon 42 or a loss of HETT 41 condition when a train brake command is in release state at 1, the HEU will remain in an inactive state. Only when the train brake command is set to apply at 2, will the HEU act concerning a loss of train-line continuity.

Likewise, the loss of train-line power could render the ECP train brake inactive, as each CCD within the train requires train-line power to charge the local batteries and remain functional. If train-line power is lost and the batteries are not adequately charged, the effective ECP train brake may become compromised resulting in reduce train stoppage performance. To monitor train-line power, the HEU looks for the loss of power locally at the lead 41 and at the rear most ECP device of the train as reported by the EOT Beacon 42.

Once the train brake is applied, the system shall remain in the applied state of 4.1 or 4.2 until a train brake release command is again received at 5. Upon receipt of a train brake release command at 5, the ECP system shall transition back to the inactive state of 1. If a critical event remains active, then the train brake release request at 5 will be denied at 6.

The HEU shall suppress ECP ITC Network 40 events when operating in yard operation by setting the HEU operating mode to Terminal or semi-active Mode if the train brake call (TBc) is release (0%) at 5. During Terminal Mode operation, the HEU commands cut-out mode at 1 within the HEU Beacon. If the train brake call (TBc) is apply (>0%) at 2, the ECP HEU shall re-enable the ECP ITC Network control functionality. This shall occur by setting the HEU operating mode to Run (or Switch) at 4.1, dependent on the original operating mode when Terminal Mode was entered, and command all train-line brake control devices to apply the brake accordingly and as a result stop or slow the train as requested.

When TBc is "apply" and the ECP HEU has identified a current critical sub-system failure (3), the ECP HEU shall:

Set Train Brake Command (TBC)=120% and ECP Enforcement=True on the ITC Network and shall set the local electronic air brake system at 4.2.
To initiate a pneumatic emergency rate of brake pipe reduction Enunciate and log event ("ECP Critical Failure").

When TBc is "release" and the ECP HEU has identified a current critical sub-system failure, the ECP HEU shall:

Log the event locally at ECP HEU

Take no brake control action at 1.

The present method may be applied to: a) train loading facilities; b) train unloading facilities and c) yard movements for train placement, for example. The lead vehicle could be controlled by: a) operator command; c) remote operator command; and automated computer control operation. The transition from an inactive ECP mode to an active ECP mode may be by train-line brake request, received either from the operator or other system. The present method allows the ECP system to be disabled without losing the pre-attained train make-up and geometry information for reuse when system transitions to active state. Embodiments of the present invention can be realized in hardware, and/or a combination of hardware and software, e.g., a combination of hardware and software provided in a general purpose computer system with a computer program that, when being loaded and executed, controls the computer system such that it carries out the method operations described herein.

Embodiments of the present invention can also be embedded in a computer program product or computer readable medium, which comprises all the features enabling the implementation of the methods described herein, and which—when loaded in a computer system—is able to carry out these methods. Computer program, software program, in the present context mean any expression, in any language, code or notation, of a set of instructions intended to cause a system having an information processing capability and or control of hardware to perform specified functions either directly or in association with the operation of other specified hardware.

For example, embodiments of the present invention may be implemented as part of, or in conjunction with controller electronics, such as that disclosed in U.S. Pat. No. 7,073,753 (entitled "Integrated Train Control," and issued Jul. 11, 2006, which is indicative of the state of the art known by one of ordinary skill in the art to be an appropriate application context of the embodiments of the present disclosure and being hereby incorporated by reference in its entirety), U.S. Pat. No. 6,484,085 (entitled "Entering and Exiting ECP Mode for an Integrated ECP/EAB System," and issued Nov. 19, 2002, which is indicative of the state of the art known by one of ordinary skill in the art to be an appropriate application context of the embodiments of the present disclosure and being hereby incorporated by reference in its entirety), U.S. Pat. No. 6,980,127 (entitled "Trainline Controller Electronics," and issued Dec. 27, 2005, which is indicative of the state of the art known by one of ordinary skill in the art to be an appropriate application context of the embodiments of the present disclosure and being hereby incorporated by reference in its entirety) or equivalent technology as recognized by one of ordinary skill in the art.

Thus, for example, embodiments of the present invention may be implemented as part of, in conjunction with or in communication with controller electronics provided in associated with ECP and EAB systems. FIG. 3 is a block diagram of one example of components utilized to integrate a computer controlled brake system and an electro-pneumatic brake system, such components being potential implementation locations for embodiments of the invention.

As shown in FIG. 3, interaction and transfer of signals and control between an electronic trainline brake system (e.g., the EP-60) and a computer controlled brake system (e.g., CCBI and CCBII available from New York Air Brake Corporation) may be understood with respect to a standard or pneumatic braking and electrical braking. An example of a computer controlled locomotive brake system 110 in FIG. 3 includes an electro-pneumatic control unit (EPCU) 120 responsive to input signals to control the pressure on brake pipe 121, and the brake cylinders 124 on its locomotive. The independent application and release pipe 122 and the actuating pipe 123 run throughout the locomotive consist and allow independent control of the locomotive brakes as distinguished from the control of the pneumatic brakes in each of the car by the brake pipe 121 running throughout the train. Electrical communication and control of the locomotives in the consist may be available over the Multiple Unit (MU) trainline 125. This is generally under the control of a propulsion control system 116 that may also be an implementation location for embodiments of the present invention.

Likewise, embodiments of the present invention may be implemented in whole or in part in a computer controlled brake system 110, for example as a CCBII, that may include an integrated processor module IPM 127 which electrically may control the EPCU 120. The IPM 127 may receive inputs from an electronic brake valve (EBV) 126 having an automatic brake handle 126A to control the train brakes via the brake pipe 121 and an independent brake handle 126B to control the locomotive brakes via independent pipe 122 and actuating pipe 123. The EBV 126 is an operator brake controller or interface. An integrated locomotive computer (ILC) 129 connects the IPM to an event recorder 130 and displays 132. The event recorder 30 may be a separate element or integral to the ILC 129. Penalties, for example Alerter and Overspeed, are inputs to the ILC 129. The propulsion system 116 communicates with the ILC 129. The lead locomotive propulsion system communicates with other locomotive propulsion systems within a common consist via MU trainline 125.

The IPM 127 is connected to other locomotive systems, not shown, and provides typical outputs, such as a power cut-off switch signal (PCS), emergency sand signal (ES) and emergency magnetic valve (EMV). The IPM 127 may be integrated with distributed power DP 114 (not shown) and may communicate via DP radio module 133 to the other locomotives in the consist as well as distributed throughout the train. An end of train radio 131 may communicate to the end of train device.

The connection between the IPM 127, the EBV 126 and the EPCU 120 is by a common bus. The suggested connection is a LonWorks bus wherein each of the modules is a node on the network. The connection between the IPM 127 and the ILC 129 is a standard serial link, for example, an RS422-HDLC. The system as described so far is well known and need not be described in further detail.

The controls of an ECP brake system of the prior art is illustrated as EP-60 available from New York Air Brake Corporation as an example. The ECP brake system (112) includes a trainline power supply TPS 141, which converts battery power from the locomotive to power for the ECP train line 140. This is an electric line that runs throughout the train and provides electrical power and communications to EP-60 brakes on each car and if available on locomotives. A trainline communication controller (TCC) 142 is connected to the ECP trainline 140 as a node on the trainline network. A car ID node 145 is shown as part of the EP-60 system. In other conventional systems, the TCC 142 may have no control over the pneumatic brake lines 121, 122 and 123. It may only control communication, either providing or receiving information, via the ECP trainline 140. Thus, it can only communicate with other locomotives in the train which have ECP trainline controllers or ECP car nodes on the network and connected to the ECP trainline 140. Although the ECP trainline is shown as a line running through each car in the train, it is to be understood that the ECP network may be by radio communication or other non-wire connection.

As implemented in other conventional systems, the ECP brake system may run in parallel to that of the conventional pneumatic or computer control locomotive train controls. Then two brake valves are provided, one being the pneumatic brake valve and the other being the ECP brake valve. Similarly, separate displays are provided. The locomotive or the consist of the locomotives do not respond to the brake commands made by the ECP locomotive system. Also, the ECP system has its own discrete input/output to the event recorder 130 and locomotive controls to determine penalties.

The integrating of the computer controlled locomotive braking system 110 with the ECP brake system 112 is achieved by interconnecting these systems as nodes on a common network as shown. The integration results in having only a single brake valve or operator interface, namely the CCB EBV 126, and eliminating the ECP brake valve. Also, separate access to the event recorder 130, end of train device and a display for the TCC 142 is not required and is available from the computer control locomotive brake system 110 in or directly from the ILC. Access to the penalties and other locomotive controls for the TCC 142 is also through the computer control brake system 110 or directly from the ILC. Finally, the ability of the locomotive brakes to be under the electronic control of the TCC 142 is provided.

As shown in FIG. 3, the ILC 129 is directly connected by, for example, an RS 422 HDLC serial communications link to the TCC 142 in locomotive system integration applications. This provides access to the event recorder 130 via the ILC 129. For non-integrated applications, the TCC 142 may have its own operator interface 44, not shown.

The train control signal from the brake valve 126 is provided to the IPM 127 and, depending upon whether the IPM 127 is in the pneumatic or the electric mode, either controls the electro-pneumatic control unit 120 for control of brake pipe 121, or provides the brake command signals to the TCC 142 which provides electrical train brake signals over the ECP trainline 140. The IPM 127 will not reduce the equalization reservoir (not shown) in response to the brake valve automatic handle movements in ECP mode as it would in the pneumatic mode. This keeps the brake pipe 121 fully charged in the ECP mode.

All locomotives equipped with ECP will respond to the control signal on the ECP trainline 140 to apply its brakes in response to an ECP application. Simultaneously, the lead and any remote ECP equipped locomotive will apply the proportional pneumatic brake signal on the independent brake application and release pipe 122. The signal on this pipe will be monitored by the trailing locomotive units that do not have ECP capability and will apply the locomotive brakes accordingly.

A switch or set-up process will provide an indication to the IPM 127 whether it should be operating in the pneumatic or the electric control mode.

The IPM 127 in combination with the EBV 126 in FIG. 3 forms a brake controller that provides locomotive and train brake commands. TCC 142 forms a first brake control connected to the brake controller 127, 126 and transmits an electronic car brake signal on the network or ECP trainline 140 for train brake commands. A second brake control, which includes EPCU 120, is also connected to the brake controller 127, 126 and transmits a locomotive pneumatic brake signal on the locomotive brake control pipe, which is the independent pipe 122, for locomotive brake commands. For distributed power operation, the ILC 129 in combination with the IPM 127 interfaces to the propulsion system 116 and the locomotive ECP brake system to transmit propulsion signals via TCC 142 to remote locomotives. The applying and release of the locomotive brakes is provided through the independent pipe 122 and the actuating pipe 123 controls.

Further, embodiments within the scope of the present invention provide a controller that may be implemented on a general purpose computer or a special purpose computer provided in association with hardware and/or software provided on one or more locomotives and/or cars of a train. Embodiments also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A method of operating an Electrically Controlled Pneumatic (ECP) brake system that includes a system controller and a plurality of ECP devices on a train, the method providing a semi-active mode between an active mode and an inactive mode, the method comprising:
   setting the system controller to the semi-active mode in response to an ECP brake release command;
   setting, by the system controller, released ECP devices to an inactive state when the system controller enters the semi-active mode;
   setting the plurality of ECP devices to an active state to apply the brake by the system controller in response to an ECP brake apply command; and
   resetting the plurality of ECP devices to a release state and then to the inactive state by the system controller in response to an ECP brake release command,
   wherein, in the semi-active mode, full operational control of the ECP devices is disabled, and a transition back to an original state is performed without re-initializing the system, and
   wherein, during the semi-active mode, the system controller maintains power on a train-line to the plurality of ECP devices and monitors train-line integrity.

2. The method of claim 1, wherein the ECP system automatically transitions from an active mode to an inactive mode and then back to an active mode, while maintaining the originally established train make-up information and the previously selected ECP system operating mode.

3. The method of claim 2, wherein the previously selected ECP brake system operation mode is Run or Switch.

4. The method of claim 1, wherein the system controller determines if a critical event has occurred for the ECP brake system, and if so, the system controller sets a pneumatic brake system to apply in response to an ECP brake command of apply.

5. The method of claim 4, wherein the system controller sets the pneumatic brake system to an emergency apply state in response to an ECP brake command of apply if a critical event has occurred.

6. The method of claim 4, wherein the system controller maintains the ECP brake system and the pneumatic brake system applied in response to an ECP release command if the critical event remains active.

7. An Electrically Controlled Pneumatic (ECP) brake system that includes a system controller and a plurality of ECP devices on a train, wherein the system controller is programmed to:
   enter a semi-active mode in response to an ECP brake release command;
   set released ECP devices to an inactive state when the system controller enters the semi-active mode;
   set the plurality of ECP devices to an active state to apply the brake in response to an ECP brake apply command; and
   set the plurality of ECP devices to a release state and then to the inactive state in response to an ECP brake release command,
   wherein, in the semi-active mode, full operational control of the ECP devices is disabled, and a transition back to an original state is performed without re-initializing the system, and
   wherein, during the semi-active mode, the system controller maintains power on a train-line to the plurality of ECP devices and monitors train-line integrity.

8. The system of claim 7, wherein the ECP system automatically transitions from an active mode to an inactive mode and then back to an active mode while maintaining the originally established train make-up information and the previously selected ECP system operating mode.

9. The system of claim 8, wherein the previously selected ECP brake system operation mode is Run or Switch.

10. The system of claim 7, wherein the system controller is configured to determine if a critical event has occurred for the ECP brake system, and if so, the system controller sets a pneumatic brake system to apply in response to an ECP brake command of apply.

11. The system of claim 10, wherein the system controller is configured to set the pneumatic brake system to an emergency apply state in response to an ECP brake command of apply if a critical event has occurred.

12. The system of claim 10, wherein the system controller is configured to maintain the ECP brake system and the pneumatic brake system applied in response to an ECP release command if the critical event remains active.

\* \* \* \* \*